(12) United States Patent
Kim et al.

(10) Patent No.: US 10,277,074 B2
(45) Date of Patent: Apr. 30, 2019

(54) WIRELESS POWER TRANSMITTER AND METHOD FOR CONTROLLING THE SAME

(71) Applicant: Samsung Electro-Mechanics Co., Ltd., Suwon-si (KR)

(72) Inventors: Se Joo Kim, Suwon-si (KR); Sang Ho Cho, Suwon-si (KR); Hyo Young Kim, Suwon-si (KR); In Wha Jeong, Suwon-si (KR); Ki Hong Kim, Suwon-si (KR); Young Woon Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 246 days.

(21) Appl. No.: 15/393,305

(22) Filed: Dec. 29, 2016

(65) Prior Publication Data

US 2017/0271923 A1 Sep. 21, 2017

(30) Foreign Application Priority Data

Mar. 15, 2016 (KR) .................. 10-2016-0031162
Jun. 3, 2016 (KR) .................. 10-2016-0069301

(51) Int. Cl.
*H02J 50/12* (2016.01)
*H02J 7/02* (2016.01)

(52) U.S. Cl.
CPC ............. *H02J 50/12* (2016.02); *H02J 7/025* (2013.01)

(58) Field of Classification Search
CPC .................................. H02J 50/12
USPC ............................................. 301/104
See application file for complete search history.

(56) References Cited

U.S. PATENT DOCUMENTS

| | | | | |
|---|---|---|---|---|
| 2002/0159281 A1* | 10/2002 | Furukawa | ........... | H02M 7/5387 363/132 |
| 2011/0198919 A1* | 8/2011 | Hattori | ................ | B60L 11/1811 307/9.1 |
| 2016/0043567 A1* | 2/2016 | Matsumoto | ........... | H02J 7/0042 307/104 |
| 2016/0079792 A1 | 3/2016 | Jeong et al. | | |

FOREIGN PATENT DOCUMENTS

| | | |
|---|---|---|
| KR | 10-2015-0093588 A | 8/2015 |
| KR | 10-2016-0030801 A | 3/2016 |
| WO | WO 2015/119456 A1 | 8/2015 |

* cited by examiner

*Primary Examiner* — Joseph Chang
(74) *Attorney, Agent, or Firm* — NSIP Law (57) ABSTRACT

A wireless power transmitter includes a common bridge circuit configured to apply a first alternating current (AC) voltage to a terminal of each of a first resonator and a second resonator of the resonators, a first sub-bridge circuit configured to apply a second alternating current (AC) voltage to another terminal of the first resonator while the first alternating current (AC) voltage is being applied to the terminal of the first resonator, and a second sub-bridge circuit configured to apply a third alternating current (AC) voltage to another terminal of the second resonator while the first alternating current (AC) voltage is being applied to the terminal of the first resonator.

22 Claims, 8 Drawing Sheets

FIG. 11

WIRELESS POWER TRANSMITTER AND METHOD FOR CONTROLLING THE SAME

CROSS-REFERENCE TO RELATED APPLICATION(S)

This application claims benefit under 35 USC § 119(a) of priority to Korean Patent Application Nos. 10-2016-0031162 filed on Mar. 15, 2016 and 10-2016-0069301 filed on Jun. 3, 2016 in the Korean Intellectual Property Office, the entire disclosures of which are incorporated herein by reference for all purposes.

BACKGROUND

1. Field

The following description relates to a wireless power transmitter and a method for controlling the same.

2. Description of Related Art

With the development of wireless technology, various wireless functions, ranging from the transmission of data to the transmission of power, have increased. Wireless power charging technology that is able to charge an electronic device with power, even in a non-contact state has been developed.

In wireless charging, a resonance coil of a wireless power transmitter and a receiving coil of a wireless power receiver are positioned to correspond to each other. Therefore, some wireless power transmitter provides a wider chargeable area by providing a plurality of resonance coils.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless power transmitter capable of removing mutual interference between a plurality of resonance coils, and a method for controlling the same.

In another general aspect, there is provided a wireless power transmitter including resonators transmitting power in a non-contact manner, a common bridge circuit configured to apply a first alternating current (AC) voltage to a terminal of each of a first resonator and a second resonator of the resonators, a first sub-bridge circuit configured to apply a second alternating current (AC) voltage to another terminal of the first resonator while the first alternating current (AC) voltage is being applied to the terminal of the first resonator, and a second sub-bridge circuit configured to apply a third alternating current (AC) voltage to another terminal of the second resonator while the first alternating current (AC) voltage is being applied to the terminal of the first resonator.

The voltage across the second resonator may be maintained to have substantially a same potential while the first alternating current (AC) voltage is applied to the terminal of the first resonator.

The first resonator and the second resonator may include a resonance coil and a resonance capacitor.

The resonance coils of the first resonator and the second resonator may overlap with each other.

The second alternating current (AC) voltage may have a phase difference of 180° with the first alternating current (AC) voltage.

An alternating current (AC) may be provided to the first resonator while the first alternating current (AC) voltage is applied to one terminal of the first resonator.

The first sub-bridge circuit and the common bridge circuit may operate together as a full-bridge circuit.

In another general aspect, there is provided a method for driving a wireless power transmitter wirelessly transmitting power in a non-contact manner, the method including controlling a common bridge circuit to apply a first alternating current (AC) voltage to a terminal of each of a first resonator and a second resonator, controlling a first sub-bridge circuit to apply a second alternating current (AC) voltage to another terminal of the first resonator while the first alternating current (AC) voltage is being applied, and controlling a second sub-bridge circuit to apply a third alternating current (AC) voltage to another terminal of the second resonator by while the first alternating current (AC) voltage is being applied.

The controlling of the second sub-bridge circuit may include controlling a voltage across the second resonator to have substantially a same potential while an alternating current (AC) is provided to the first resonator.

The third alternating current (AC) voltage may have a same phase as the first alternating current (AC) voltage.

The first sub-bridge circuit and the common bridge circuit may be operated together as a full-bridge circuit.

In another general aspect, there is provided a wireless power transmitter including a common bridge circuit including a first switch connected between a terminal of each of a first resonator and a second resonator and a power source, and a second switch connected between the terminal of each of the first resonator and the second resonator and a ground, a first sub-bridge circuit including a third switch connected between another terminal of the first resonator and the power source, and a fourth switch connected between the another terminal of the first resonator and the ground, and a second sub-bridge circuit including a fifth switch connected between another terminal of the second resonator and the power source, and a sixth switch connected between the another terminal of the second resonator and the ground, wherein the first switch and the second switch are alternately operated to apply a first alternating current (AC) voltage to the terminal of each of the first and the second resonators, wherein the third switch and the fourth switch are alternately operated to apply a second alternating current (AC) voltage to the another terminal of the first resonator, and wherein the fifth switch and the sixth switch are alternately operated to be the same as the first switch and the second switch.

A voltage across the second resonator may be maintained to have substantially the same potential while the first alternating current (AC) voltage is applied to the terminal of the first resonator.

The first resonator and the second resonator may include a resonance coil and a resonance capacitor.

The resonance coils of the first resonator and the second resonator may overlap with each other.

The third switch may perform the same switching operation as the second switch, and the fourth switch may perform the same switching operation as the first switch.

In another general aspect, there is provided a wireless power transmitter including a controller configured to control an inverter, resonators configured to transmit power, the inverter including a common bridge circuit and a plurality of sub-bridge circuits corresponding to a number of the resonators, wherein the common bridge circuit is connected to a first terminal of each of a first resonator and a second resonator among the resonators, a first sub-bridge circuit of the plurality of sub-bridge circuits is connected to a second terminal of the first resonator, a second sub-bridge circuit of the plurality of sub-bridge circuits is connected to a second terminal of the second resonator, and wherein the controller is configured to control the second sub-bridge circuit to perform the same switching operation as the common bridge circuit, in response to the first resonator being operated.

The controller may be configured to operate the first sub-bridge circuit and the common bridge circuit as a full-bridge circuit.

The common bridge circuit may be configured to apply a first alternating current (AC) voltage to the first terminal of each of the first resonator and the second resonator, the first sub-bridge circuit may be configured to apply a second AC voltage to the second terminal of the first resonator while the first AC voltage is being applied, and the second sub-bridge circuit may be configured to apply a third AC voltage to the second terminal of the second resonator while the first AC voltage is being applied.

The resonators may include a resonance coil and a resonance capacitor disposed on a ferrite sheet.

Other features and aspects will be apparent from the following detailed description, the drawings, and the claims.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or apparatuses described herein. However, various changes, modifications, and equivalents of the methods, apparatuses, and/or apparatuses described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application FIG. 1 is a diagram illustrating an example of a wireless power transmitter included in a wireless power transmission apparatus.

Figure 1:
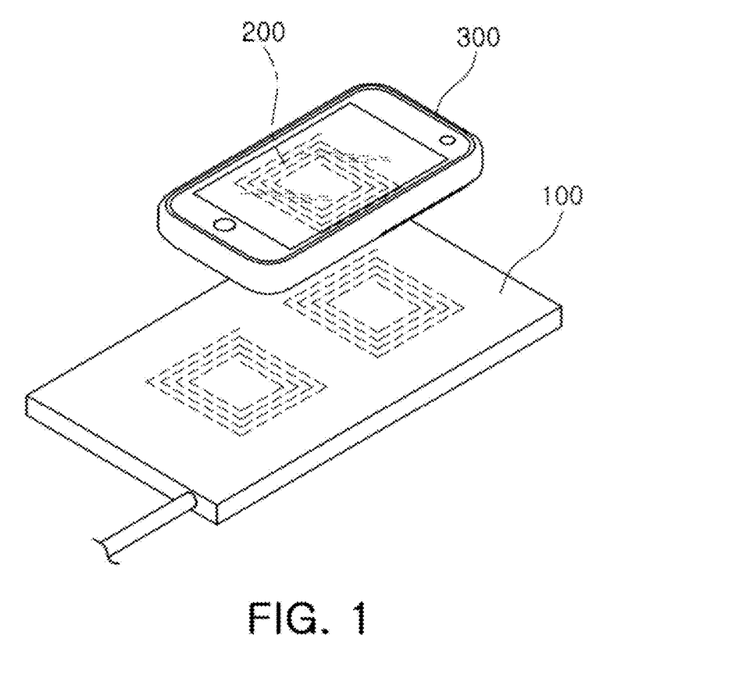
FIG. 1 is a diagram illustrating an example of a wireless power transmission apparatus including a wireless power transmitter.

Referring to FIG. 1, a wireless power receiver 200 is situated adjacent to a wireless power transmitter 100. The wireless power receiver 200 receives wirelessly power by being magnetically coupled (e.g., to magnetically resonate with or to be magnetically induced by) to the wireless power transmitter 100.

The wireless power receiver 200 provides the received power to an electronic device 300. In an example, the wireless power receiver 200 exists as a component within the electronic device 300. In another example, the wireless power receiver 200 is a separate device, connected to the electronic device 300.

As a non-exhaustive illustration only, the wireless power receiver 200 and the wireless power transmitter 100 described herein may be incorporated in digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, video game consoles, television set-top boxes, e-book readers, a setup box, television set-top boxes, e-book readers, robot cleaners, a home appliance, content players, communication systems, image processing systems, graphics processing systems, or any other consumer electronics/information technology (CE/IT) device consistent with that disclosed herein. The wireless power receiver 200 and the wireless power transmitter 100 may also be implemented in a smart appliance, an intelligent vehicle, or in a smart home system.

In an example, wireless power receiver 200 and the wireless power transmitter 100 is implemented in a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another example, the wearable device may be embedded in one or more apparel or footwear worn by the user.

Although the wireless power receiver 200 and the wireless power transmitter 100 are partially spaced apart from each other in the illustrated example, this is merely illustrative. The wireless power receiver 200 and the wireless power transmitter 100 may be in contact with each other or may be adjacent to each other without departing from the spirit and scope of the illustrative examples described.

In an example, the wireless power transmitter 100 includes a plurality of resonance coils. The wireless power receiver 200 may be magnetically coupled to the wireless power transmitter 100 in any position on the wireless power transmitter 100.

To reduce mutual influence between the plurality of resonance coils, the wireless power transmitter 100 may perform a control so that voltages across resonators that are not being operated have substantially the same potential.

The wireless power transmitter 100 will be described below in more detail with reference to FIGS. 2 through 8.

Figure 2:
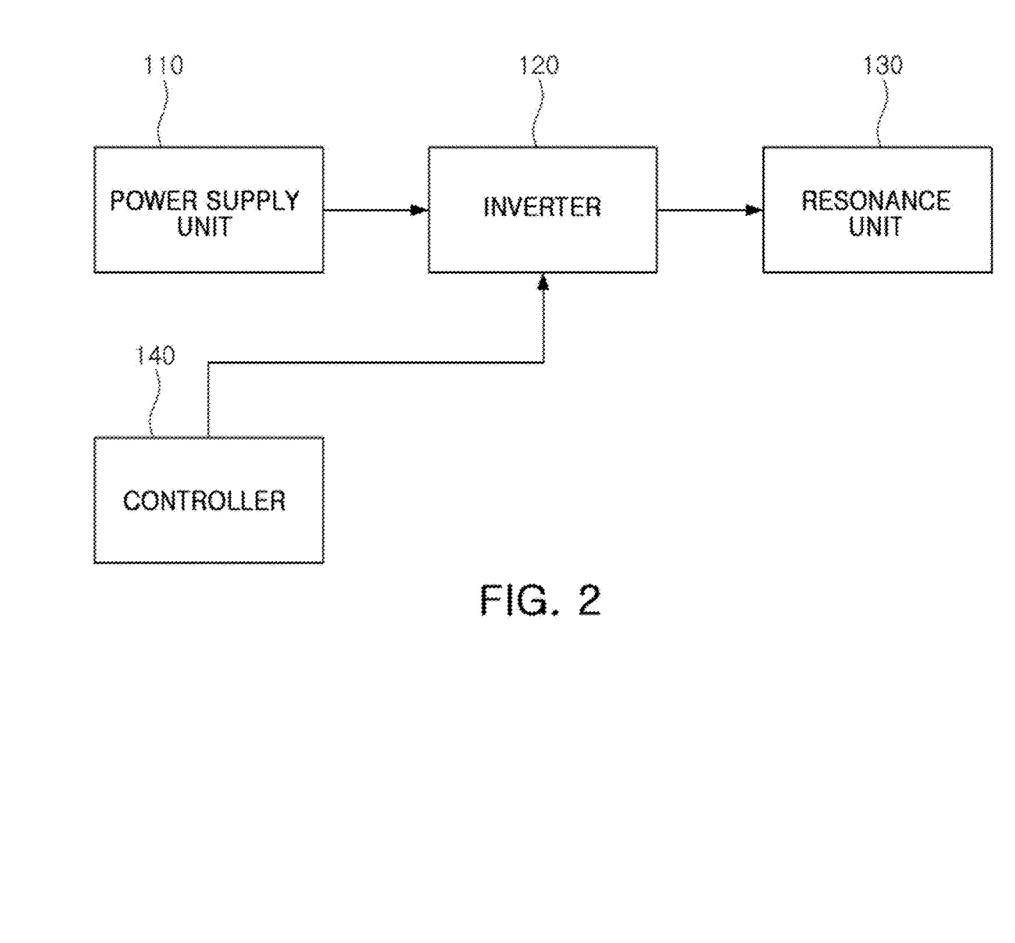
FIG. 2 is a diagram illustrating an example of a wireless power transmitter.

FIG. 2 is a diagram illustrating an example of the wireless power transmitter.

Referring to FIG. 2, the wireless power transmitter 100 includes an inverter 120, a resonance unit 130, and a controller 140. According to an embodiment, the wireless power transmitter 100 may further include a power supply unit 110.

The power supply unit 110 generates a predetermined level of direct current (DC) voltage using power input from outside. In an example, the power supply unit 110 is configured as a device independent of the wireless power transmitter 100. For example, the power supply unit 110 may be an adapter device that receives a commercial alternating current (AC) voltage and outputs a predetermined level of voltage (e.g., a voltage of 5V).

In an example, the inverter 120 receives the DC voltage and perform a switching operation according to a control of the controller 140 to provide an alternating current (AC) to the resonance unit 130.

According to an embodiment, the inverter 120 includes one common bridge circuit, and a plurality of sub-bridge circuits each corresponding to a plurality of resonators of the resonance unit 130.

In an example, the resonance unit 130 operates by receiving the alternating current (AC) from the inverter 120.

In an example, the resonance unit 130 includes a plurality of resonators. In an example, each resonator includes a resonance coil and a resonance capacitor.

In an example, the controller 140 controls the switching operation of the inverter 120.

To reduce mutual influence between the plurality of resonance coils, the controller 140 may perform a control so that voltages across resonators that are not being operated have the same potential.

The controller 140 may support various switching control methods, such as, for example, adjusting the alternating current (AC) by changing a pulse width, or adjusting the alternating current (AC) by changing a frequency.

In an example, the controller 140 may include at least one processing unit. According to an embodiment, the controller 140 may further include a memory, which is described below. The processing unit may have a plurality of cores and may include, for example, a central processing unit (CPU), a graphics processing unit (GPU), a microprocessor, an application specific integrated circuit (ASIC), field programmable gate arrays (FPGA), or the hardware components described below.

Figure 3:
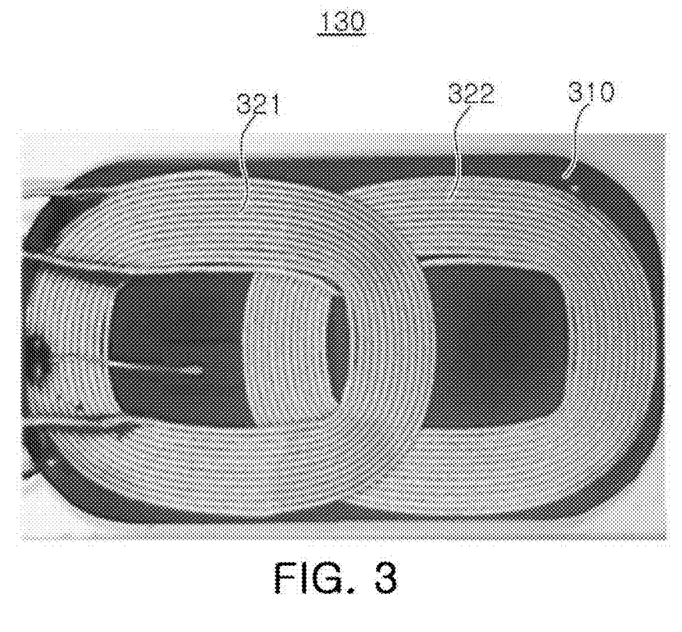
FIG. 3 is a diagram illustrating an example of a resonance coil.

FIG. 3 is a diagram illustrating an example of a resonance coil of the resonance unit. FIG. 3 illustrates an example in which the resonance unit includes two resonance coils. The number of resonance coils in the resonance units may be varied without departing from the spirit and scope of the illustrative examples described.

Referring to FIG. 3, in an example, the resonance unit 130 includes a first resonance coil 321 and a second resonance coil 322. In an example, the resonance unit 130 includes a ferrite sheet 310 attached to rear surfaces of the first resonance coil 321 and the second resonance coil 322.

The first resonance coil 321 and the second resonance coil 322 may overlap with each other in at least some regions. By disposing the first resonance coil 321 and the second resonance coil 322 to be overlapped with each other, a depletion region in which power does not arrive wirelessly is reduced, and a wider wireless chargeable area with the wireless power receiver is provided.

Figure 4:
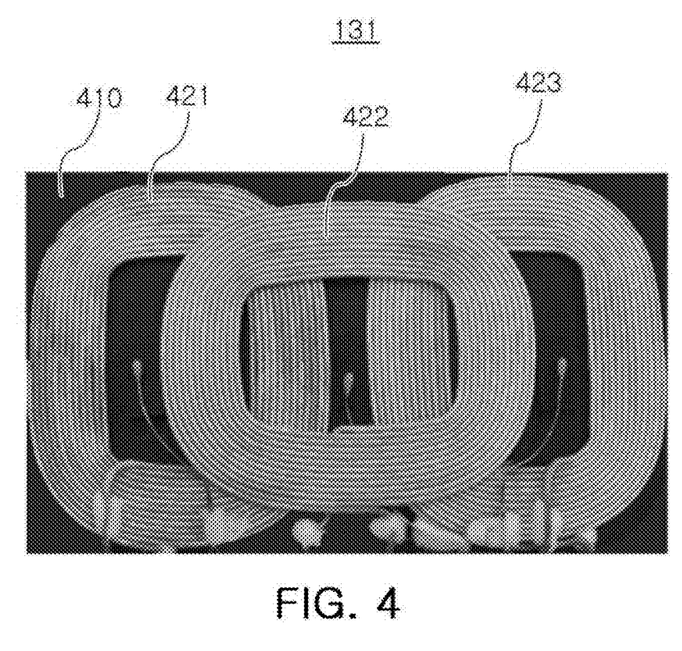
FIG. 4 is a diagram illustrating an example of the resonance coil.

FIG. 4 is a diagram illustrating an example of the resonance coil of the resonance unit. FIG. 4 illustrates an example in which the resonance unit includes three resonance coils. The number of resonance coils in the resonance units may be varied without departing from the spirit and scope of the illustrative examples described.

Referring to FIG. 4, in an example, the resonance unit 131 includes a first resonance coil 421, a second resonance coil 422, and a third resonance coil 423. In an example, the resonance unit 131 includes a ferrite sheet 410 attached to rear surfaces of the first resonance coil 421 to the third resonance coil 423.

The first resonance coil 421 to the third resonance coil 423 may overlap with each other in at least some regions. For example, the first resonance coil 421 and the second resonance coil 422 may be overlapped with each other, and the second resonance coil 422 and the third resonance coil 423 may be overlapped with each other. By disposing a plurality of coils to be partially overlapped with each other, a depletion region in which the power does not arrive wirelessly is reduced, and a wireless chargeable area using the wireless power receiver is expanded.

Figure 5:
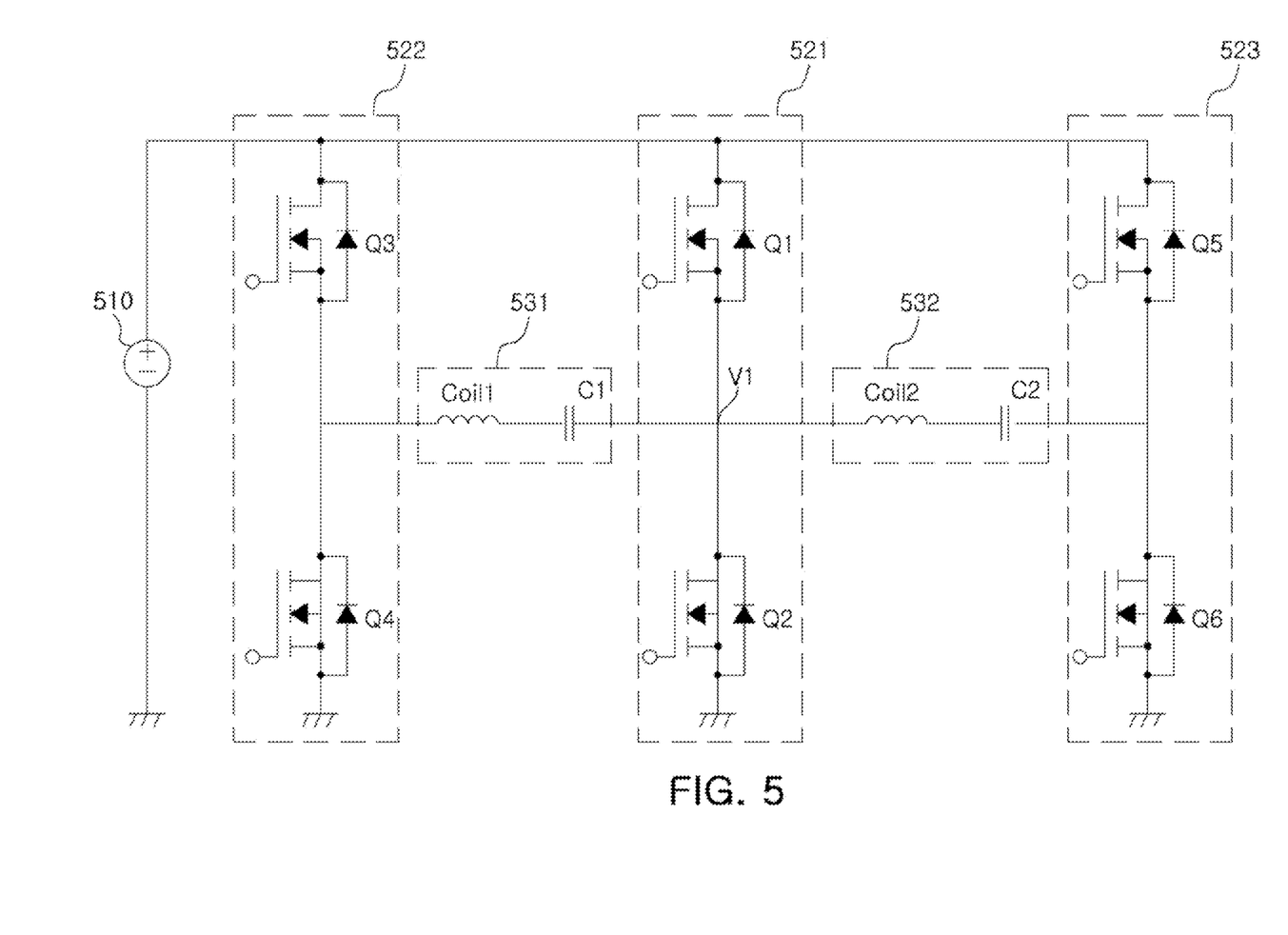
FIG. 5 is a circuit diagram illustrating an example of an inverter illustrated in FIG. 2.

FIG. 5 is a diagram illustrating an example of an inverter illustrated in FIG. 2. The example illustrated in FIG. 5 illustrates an inverter driving the resonance unit including two resonators.

Referring to FIG. 5, the inverter may include a common bridge circuit 521, and a plurality of sub-bridge circuits 522 and 523. The controller may control the switches of the inverter.

The common bridge circuit 521 may be operated even when a resonance coil of the resonance unit is operated. The plurality of sub-bridge circuits 522 and 523 may be operated to correspond to the plurality of resonators, respectively.

In an example when a first resonator 531 is operated to wirelessly transmit power, the common bridge circuit 521 may be connected to one terminal of each of the first resonator 531 and a second resonator 532 to apply an alternating current (AC) voltage.

In an example, the common bridge circuit 521 and a first sub-bridge circuit 522 may alternately perform a switching operation. The common bridge circuit 521 and the first sub-bridge circuit 522 may be operated as a single full-bridge circuit, and DC power provided from a power supply unit 510 according to the switching operation may be converted into an alternating current (AC) to be provided to the first resonator 531.

When the second resonator 532 is operated to wirelessly transmit power, the common bridge circuit 521 and a second sub-bridge circuit 523 may alternately perform the switching operation. The common bridge circuit 521 and the second sub-bridge circuit 523 may be operated as a single full-bridge circuit.

Hereinafter, a resonator radiating a magnetic field to wirelessly transmit the power will be described as an operated resonator.

Figure 6:
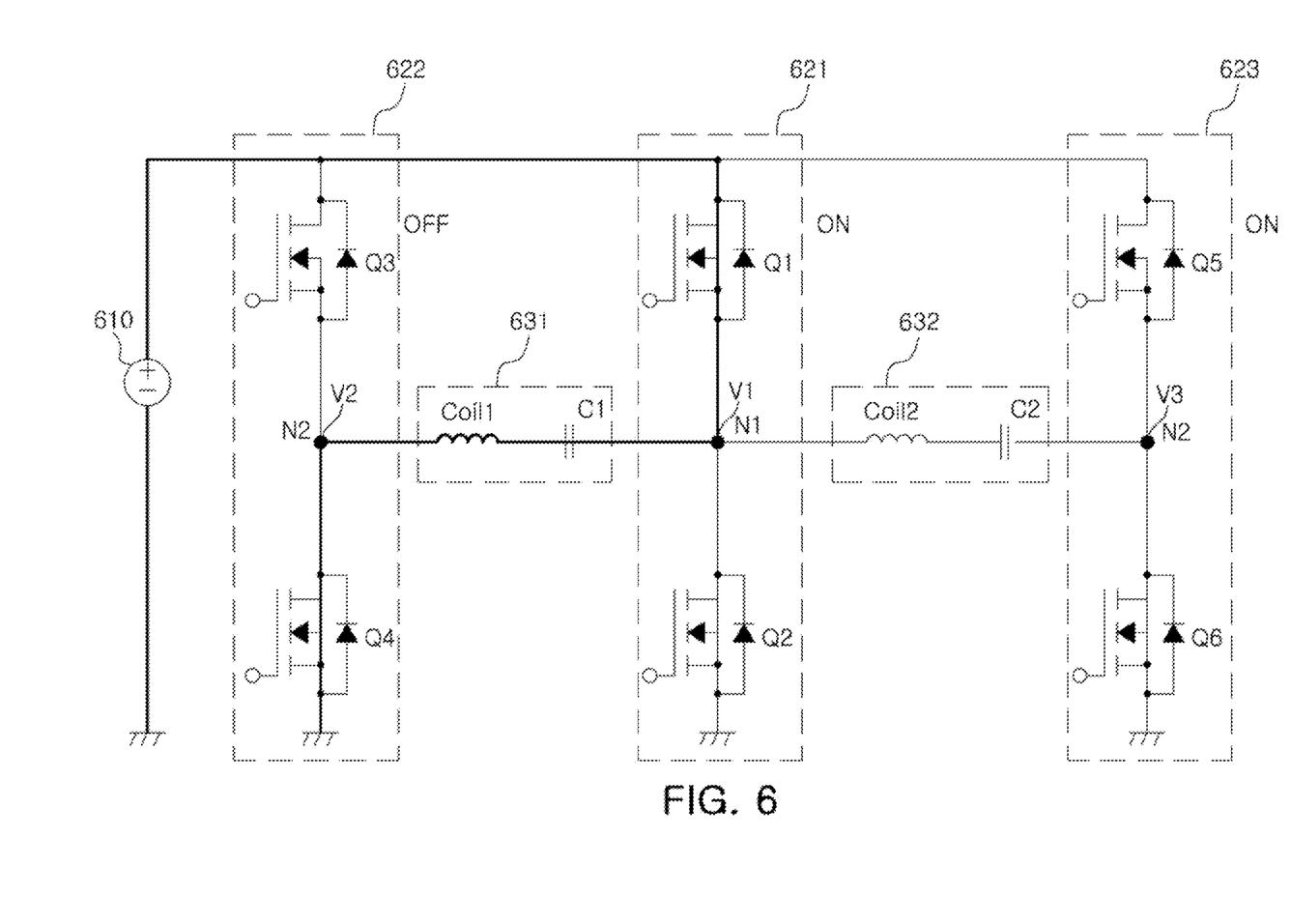
FIG. 6 is a circuit diagram illustrating an operation of the inverter illustrated in FIG. 5.

FIG. 6 is a diagram illustrating an operation of the inverter illustrated in FIG. 5.

The circuit diagram illustrated in FIG. 6 illustrates an example of a switching operation when an operated resonator is a first resonator 631 and DC power is provided from a power supply unit 610. However, this case is taken for convenience of explanation, and one or more of the plurality of resonators may be selectively or simultaneously operated to wirelessly transmit the power as described above. In a case in which the first resonator 631 is not operated and a second resonator 632 is operated, an operation related to the first resonator 631 described below may be applied based on the second resonator 632. This may be equally applied to a case in which some the resonators are operated and the remaining resonators are not operated.

To operate the first resonator 631, a common bridge circuit 621 and a first sub-bridge circuit 622 may be operated as a full-bridge circuit. A fourth switch Q4 and a first switch Q1 may be in a turned-on state, and a third switch Q3 and a second switch Q2 may be in a turned-off state. In this configuration, a current may flows from a first node N1, a right node of the first resonator 631, to a second node N2, a left node of the first resonator 631.

In another example, in a subsequent alternating switching operation, the fourth switch Q4 and the first switch Q1 may be changed to the turned-off state, and the third switch Q3 and the second switch Q2 may be changed to the turned-on state. In this configuration, the current flows from the second node N2, the left node of the first resonator 631, to the first node N1, the right node of the first resonator 631.

An alternating current (AC) flowing in different directions according to a predetermined period of the first resonator 631 may be provided to the first resonator 631 by alternately operating switches of the common bridge circuit 621 and the first sub-bridge circuit 622.

According to an embodiment, the first switch Q1 and the second switch Q2 may be alternately operated at a duty ratio of 50%, and the third switch Q3 and the fourth switch Q4 may be alternately operated at a duty ratio of 50%. The duty ratio may be changed to improve wireless transmission efficiency without departing from the spirit and scope of the illustrative examples described.

In an example, the common bridge circuit 621 applies a first alternating current (AC) voltage V1 to one terminal of each of the first resonator 631 and the second resonator 632.

While the first alternating current (AC) voltage V1 is applied to one terminal of the first resonator 631, the first sub-bridge circuit 622 connected to the other terminal of the first resonator 631 may apply a second alternating current (AC) voltage V2 to the other terminal of the first resonator 631, and the second sub-bridge circuit 623 connected to the other terminal of the second resonator 632 may apply a third alternating current (AC) voltage V3 to the other terminal of the second resonator 632.

In an example, the second alternating current (AC) voltage V2 may have the same voltage level as the first alternating current (AC) voltage V1, and may have a phase difference of 180° with the first alternating current (AC) voltage V1.

In an example, the third alternating current (AC) voltage V3 may have the same voltage level as the first alternating current (AC) voltage V1, and may have the same phase as the first alternating current (AC) voltage V1.

When the first resonator 631 is operated, the second sub-bridge circuit 623 may perform the same switching operation as the common bridge circuit 621. A fifth switch Q5 of the second sub-bridge circuit 623 may perform the same switching operation as the first switch Q1 of the common bridge circuit 621, and a sixth switch Q6 of the second sub-bridge circuit 623 may perform the same switching operation as the second switch Q2 of the common bridge circuit 621.

When the second sub-bridge circuit 623 performs the same switching operation as the common bridge circuit 621, and the third alternating current (AC) voltage V3 has the same voltage level as the first alternating current (AC) voltage V1, a voltage of each of the nodes of the second sub-bridge circuit 623 may be the same as a voltage of each of the nodes of the common bridge circuit 621. Accordingly, voltages across the second resonator 632 may reach the same potential.

By performing a control so that the second sub-bridge circuit 623 connected to the other terminal of the second resonator 632, which is not being operated, performs the same switching operation as the common bridge circuit 621, the voltage across the second resonator 632 intended to suppress the radiation of the magnetic field may be maintained to be the same. Therefore, when the first resonator 631 is operated, the current may not flow in the second resonator 632.

Even when the resonance coils of two resonators overlap with each other, a phenomenon in which magnetic field causes interference by one of the resonance coils not being operated is avoided, by setting the voltage across the resonator not being operated to the same voltage.

Figure 7:
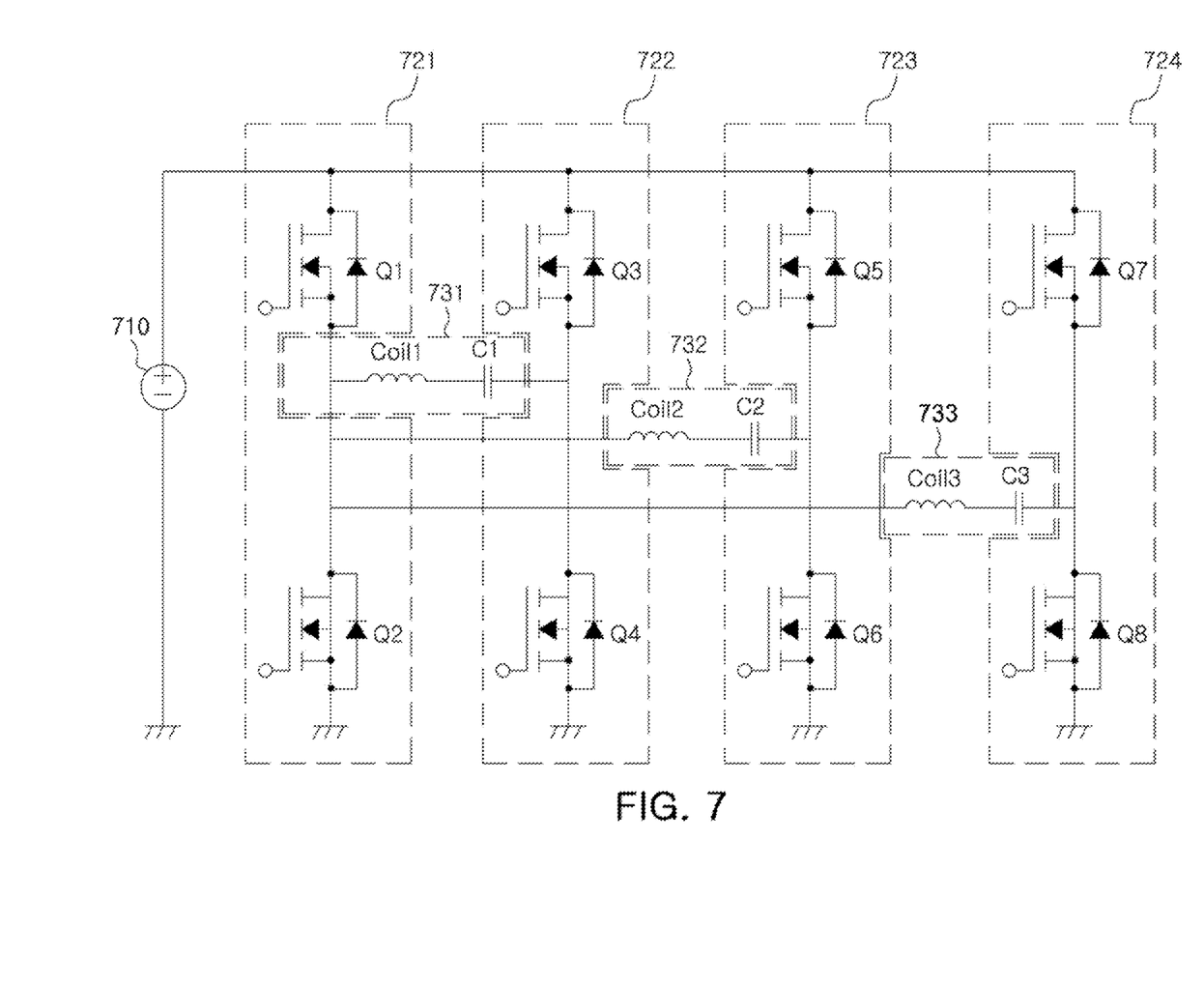
FIG. 7 is a circuit diagram illustrating an example of the inverter illustrated in FIG. 2.

FIG. 7 is a diagram illustrating another example of the inverter illustrated in FIG. 2. The example illustrated in FIG. 7 illustrates an inverter driving the resonance unit including three resonators.

Referring to FIG. 7, the inverter may include a common bridge circuit 721, and a plurality of sub-bridge circuits 722, 723, and 724. The controller may control the respective switches of the inverter.

The common bridge circuit 721 is operated even in a case in which a resonance coil of the resonance unit is operated. The plurality of sub-bridge circuits 722, 723, and 724 may be operated to correspond to the plurality of resonators.

When a first resonator 731 is operated to wirelessly transmit power, the common bridge circuit 721 and a first sub-bridge circuit 722 may alternately perform a switching operation. The common bridge circuit 721 and the first sub-bridge circuit 722 may be operated as a single full-bridge circuit.

When the second resonator 732 is operated, the common bridge circuit 721 and a second sub-bridge circuit 723 may alternately perform the switching operation. The common bridge circuit 721 and the second sub-bridge circuit 723 may be operated as a single full-bridge circuit.

When a third resonator 733 is operated, the common bridge circuit 721 and a third sub-bridge circuit 724 may alternately perform the switching operation. That is, the common bridge circuit 721 and the third sub-bridge circuit 724 may be operated as a single full-bridge circuit.

Figure 8:
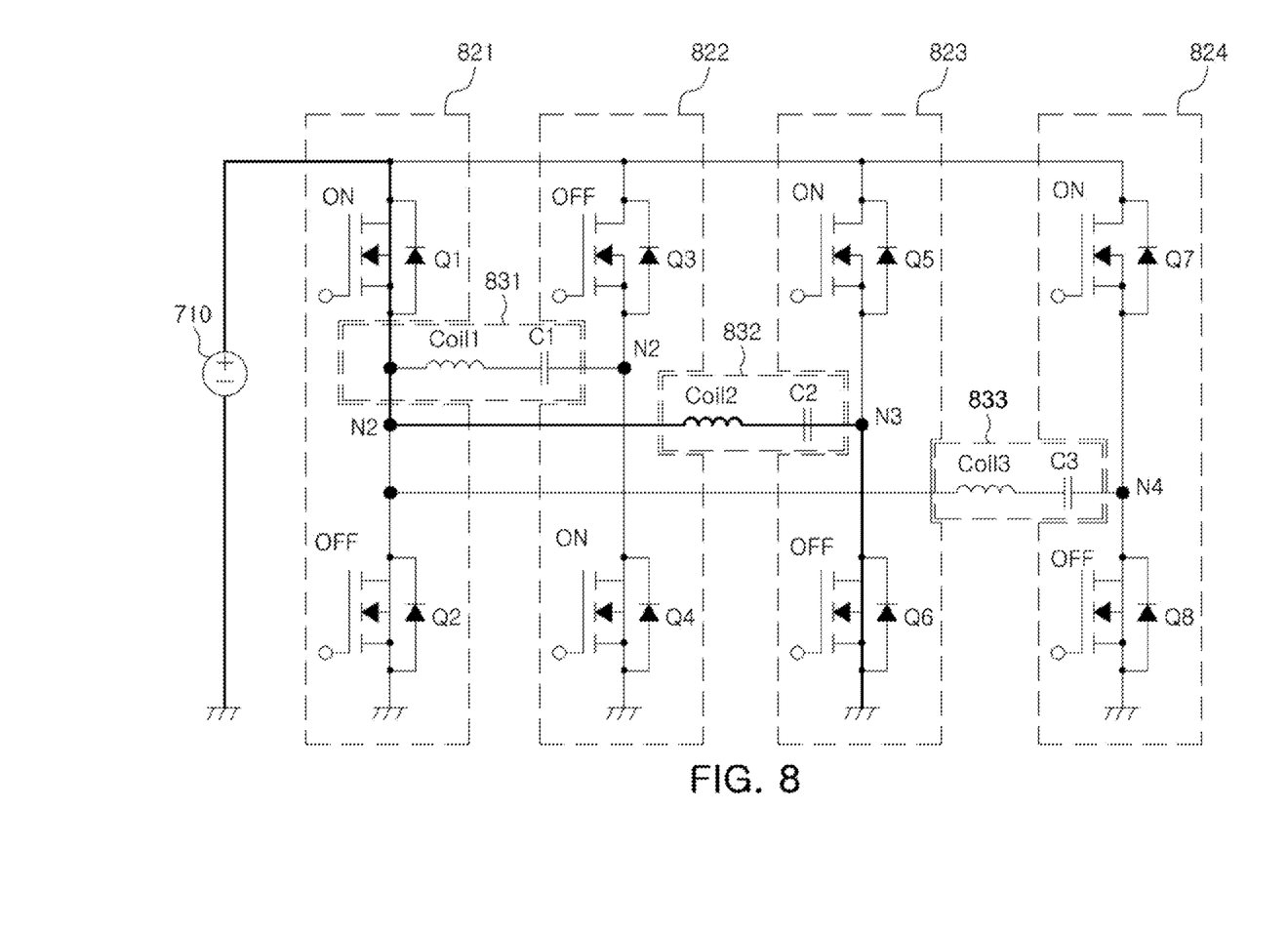
FIG. 8 is a circuit diagram illustrating an operation of the inverter illustrated in FIG. 7.

FIG. 8 is a diagram illustrating an operation of the inverter illustrated in FIG. 7.

The circuit diagram illustrated in FIG. 8 illustrates an example of a switching operation when a resonator operated to radiate a magnetic field to wirelessly transmit power is a second resonator 832. However, this case is taken for convenience of explanation, and one or more of the plurality of resonators may be selectively or simultaneously operated to wirelessly transmit the power as described above.

To operate the second resonator 832, a common bridge circuit 821 and a second sub-bridge circuit 823 may be operated as a full-bridge circuit.

In the illustrated example of FIG. 8, a first switch Q1 and a sixth switch Q6 may be in a turned-on state, and a second switch Q2 and a fifth switch Q5 may be a turned-off state. When the common bridge circuit 821 and the second sub-bridge circuit 823 are operated as described above, a current may flow from a first node N1, a left node of the second resonator 832, to a third node N3, a right node of the second resonator 832.

When the second resonator 832 is operated, sub-switch circuits which are not associated with the second resonator 832, i.e., the first sub-bridge circuit 822 and a third sub-bridge circuit 824 may perform the same switching operation as the common bridge circuit 821.

As described above, by performing the same switching operation as the common bridge circuit 821 for the first sub-bridge circuit 822 and the third sub-bridge circuit 824, voltages across the first resonator 831 and the third resonator 833 may reach the same potential.

Even when resonance coils of three resonators overlap with each other, a phenomenon in which magnetic field causes interference by the resonance coils Coil 1 and Coil 3, which are not operated, is avoided by setting the voltages across the resonators 831 and 833, which are not operated, to the same voltage.

Hereinafter, the numerical values measured in the example illustrated in FIG. 6 will be described with reference to FIGS. 9 through 11.

Figure 9:
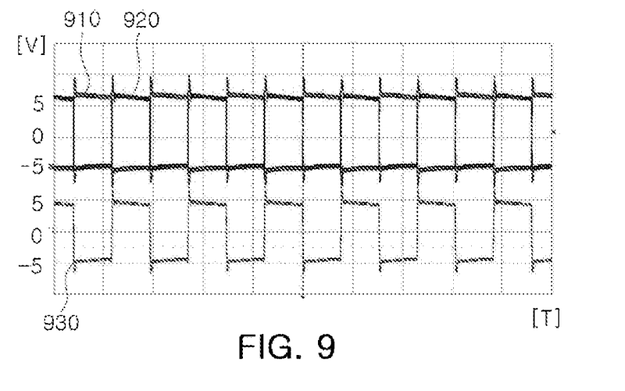
FIG. 9 is a diagram illustrating an example of a voltage detected across a first resonator, in an example of an operation illustrated in FIG. 6.

FIG. 9 is a diagram illustrating an example of voltage detected across a first resonator in the example of an operation illustrated in FIG. 6.

Referring to FIGS. 6 and 9, reference numeral 910 illustrates a voltage of the first node N1, reference numeral 920 illustrates a voltage of the second node N2, and reference numeral 930 illustrates a voltage across the first resonator 631.

As illustrated, a waveform in which the first resonator 631 is operated by the full-bridge circuit is illustrated.

Figure 10:
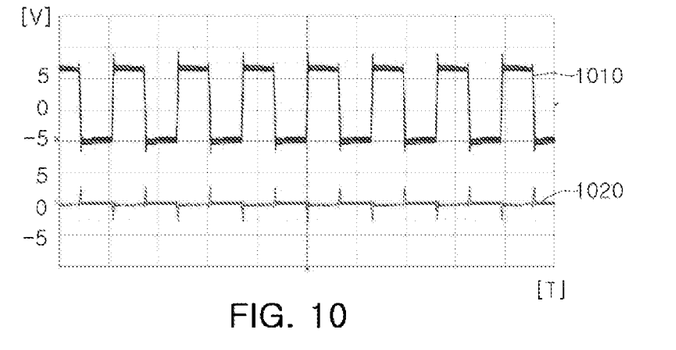
FIG. 10 is a diagram illustrating an example of a voltage detected across a second resonator, in the example of an operation illustrated in FIG. 6.

FIG. 10 is a diagram illustrating an example of voltage detected across a second resonator in the example of an operation illustrated in FIG. 6.

Referring to FIGS. 6 and 10, reference numeral 1010 illustrates the first alternating current (AC) voltage V1 and the third alternating current (AC) voltage V3, which are node voltages across the second resonator 632, not being operated. As illustrated, the third alternating current (AC) voltage V3 has the same voltage level as the first alternating current (AC) voltage V1, and it may be understood that a voltage across the second resonator 632 is barely detected, except for some edges, as in reference numeral 1020.

Since the voltage across the second resonator 632, not being operated, has the same potential, the current may not flow in the second resonator 632, not being operated.

Figure 11:
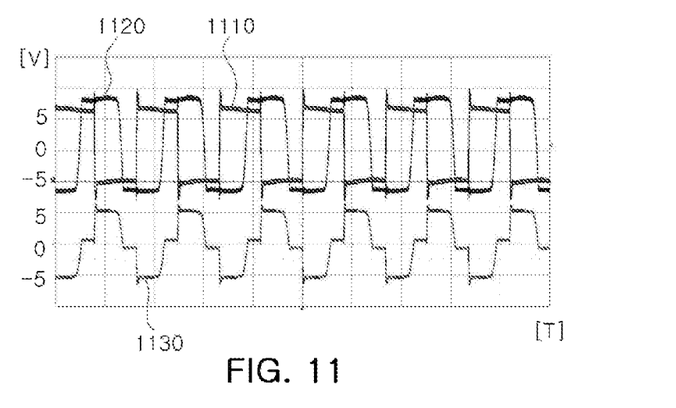
FIG. 11 is a diagram illustrating a voltage detected across the second resonator according to a switching control method of a general full-bridge circuit.

FIG. 11 is a diagram illustrating an example of a voltage detected across the third resonator detected according to a switching control method of a general full-bridge circuit.

An example illustrated in FIG. 11, a result of a switching topology of the general full-bridge circuit, which does not perform the switching control for the resonator not being operated, is a diagram illustrating a voltage across the resonator not being operated.

Reference numeral 1110 illustrates a node voltage of a node connected to one terminal of the resonator not being operated, and reference numeral 1120 illustrates a node voltage of a node connected to the other terminal of the resonator not being operated. Reference numeral 1130 illustrates a voltage across the resonator not being operated.

As illustrated, when switching is not performed for the resonator not being operated, a low voltage is induced to the resonator not being operated. Accordingly, an influence may occur by the resonator not being operated.

The wireless power transmitter disclosed above may remove the mutual interference between the plurality of resonance coils.

The controller 140 described in FIG. 2 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter comprising:
resonators transmitting power in a non-contact manner;
a common bridge circuit configured to apply a first alternating current (AC) voltage to a terminal of each of a first resonator and a second resonator of the resonators;
a first sub-bridge circuit configured to apply a second alternating current (AC) voltage to another terminal of the first resonator while the first alternating current (AC) voltage is being applied to the terminal of the first resonator; and
a second sub-bridge circuit configured to apply a third alternating current (AC) voltage to another terminal of the second resonator while the first alternating current (AC) voltage is being applied to the terminal of the first resonator.

2. The wireless power transmitter of claim 1, wherein a voltage across the second resonator is maintained to have substantially a same potential while the first alternating current (AC) voltage is applied to the terminal of the first resonator.

3. The wireless power transmitter of claim 1, wherein each of the first resonator and the second resonator comprise a resonance coil and a resonance capacitor.

4. The wireless power transmitter of claim 3, wherein the resonance coils of the first resonator and the second resonator overlap with each other.

5. The wireless power transmitter of claim 1, wherein the second alternating current (AC) voltage has a phase difference of 180° with the first alternating current (AC) voltage.

6. The wireless power transmitter of claim 1, wherein an alternating current (AC) is provided to the first resonator while the first alternating current (AC) voltage is applied to one terminal of the first resonator.

7. The wireless power transmitter of claim 1, wherein the first sub-bridge circuit and the common bridge circuit operate together as a full-bridge circuit.

8. The wireless power transmitter of claim 1, wherein the common bridge circuit is a first inverter configured to generate the first AC voltage, the first sub-bridge circuit is a second inverter configured to generate the second AC voltage, and the second sub-bridge circuit is a third inverter configured to generate the third AC voltage, and wherein the first AC voltage is respectively provided from the first inverter to the first resonator and the second resonator through one or more first passive connections, the second AC voltage is provided from the second inverter to the first resonator through a second passive connection, and the third AC voltage is provided from the third inverter to the second resonator through a third passive connection.

9. The wireless power transmitter of claim 1,
wherein, when the first resonator is not set for wireless power transmission and the second resonator is set for wireless power transmission, the first sub-bridge circuit performs a same switching operation as the common bridge circuit to cause the second AC voltage to be same as the first AC voltage, and wherein, when the second resonator is not set for wireless power transmission and first resonator is set for wireless power transmission, the second sub-bridge circuit performs the same switching operation as the common bridge circuit to cause the third AC voltage to be same as the first AC voltage.

10. A method for driving a wireless power transmitter wirelessly transmitting power in a non-contact manner, the method comprising:
controlling a common bridge circuit to apply a first alternating current (AC) voltage to a terminal of each of a first resonator and a second resonator;
controlling a first sub-bridge circuit to apply a second alternating current (AC) voltage to another terminal of the first resonator while the first alternating current (AC) voltage is being applied; and
controlling a second sub-bridge circuit to apply a third alternating current (AC) voltage to another terminal of the second resonator by while the first alternating current (AC) voltage is being applied.

11. The method of claim 10, wherein the controlling of the second sub-bridge circuit comprises controlling a voltage across the second resonator to have substantially a same potential while an alternating current (AC) is provided to the first resonator.

12. The method of claim 10, wherein the third alternating current (AC) voltage has a same phase as the first alternating current (AC) voltage.

13. The method of claim 10, wherein the first sub-bridge circuit and the common bridge circuit are operated together as a full-bridge circuit.

14. A wireless power transmitter comprising:
a common bridge circuit comprising a first switch connected between a terminal of each of a first resonator and a second resonator and a power source, and a second switch connected between the terminal of each of the first resonator and the second resonator and a ground;
a first sub-bridge circuit comprising a third switch connected between another terminal of the first resonator and the power source, and a fourth switch connected between the another terminal of the first resonator and the ground; and
a second sub-bridge circuit comprising a fifth switch connected between another terminal of the second resonator and the power source, and a sixth switch connected between the another terminal of the second resonator and the ground,
wherein the first switch and the second switch are alternately operated to apply a first alternating current (AC) voltage to the terminal of each of the first and the second resonators,
wherein the third switch and the fourth switch are alternately operated to apply a second alternating current (AC) voltage to the another terminal of the first resonator, and
wherein the fifth switch and the sixth switch are alternately operated to be the same as the first switch and the second switch.

15. The wireless power transmitter of claim 14, wherein a voltage across the second resonator is maintained to have substantially the same potential while the first alternating current (AC) voltage is applied to the terminal of the first resonator.

16. The wireless power transmitter of claim 14, wherein each of the first resonator and the second resonator comprises a resonance coil and a resonance capacitor.

17. The wireless power transmitter of claim 16, wherein the resonance coils of the first resonator and the second resonator overlap with each other.

18. The wireless power transmitter of claim 14, wherein the third switch performs the same switching operation as the second switch, and
the fourth switch performs the same switching operation as the first switch.

19. A wireless power transmitter comprising:
a controller configured to control an inverter;
resonators configured to transmit power;
the inverter comprising a common bridge circuit and a plurality of sub-bridge circuits corresponding to a number of the resonators;
wherein the common bridge circuit is connected to a first terminal of each of a first resonator and a second resonator among the resonators, a first sub-bridge circuit of the plurality of sub-bridge circuits is connected to a second terminal of the first resonator, a second sub-bridge circuit of the plurality of sub-bridge circuits is connected to a second terminal of the second resonator, and
wherein the controller is configured to control the second sub-bridge circuit to perform the same switching operation as the common bridge circuit, in response to the first resonator being operated.

20. The wireless power transmitter of claim 19, wherein the controller is further configured to operate the first sub-bridge circuit and the common bridge circuit as a full-bridge circuit.

21. The wireless power transmitter of claim 19, wherein:
the common bridge circuit is configured to apply a first alternating current (AC) voltage to the first terminal of each of the first resonator and the second resonator,
the first sub-bridge circuit is configured to apply a second AC voltage to the second terminal of the first resonator while the first AC voltage is being applied, and
the second sub-bridge circuit is configured to apply a third AC voltage to the second terminal of the second resonator while the first AC voltage is being applied.

22. The wireless power transmitter of claim 19, wherein each of the resonators comprise a resonance coil and a resonance capacitor disposed on a ferrite sheet.

* * * * *